United States Patent
Weber et al.

(10) Patent No.: US 7,988,232 B2
(45) Date of Patent: Aug. 2, 2011

(54) VEHICLE SEAT, PARTICULARLY COMMERCIAL VEHICLE SEAT

(75) Inventors: Thomas Weber, Kaiserslautern (DE); Georg Ruess, Oberarnbach (DE); Harald Klein, Matzenbach (DE); Rüdiger Nissen, Freisen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 44 days.

(21) Appl. No.: 12/447,556

(22) PCT Filed: Dec. 4, 2007

(86) PCT No.: PCT/EP2007/010496
§ 371 (c)(1),
(2), (4) Date: Apr. 28, 2009

(87) PCT Pub. No.: WO2008/071322
PCT Pub. Date: Jun. 19, 2008

(65) Prior Publication Data
US 2010/0072800 A1    Mar. 25, 2010

(30) Foreign Application Priority Data
Dec. 13, 2006 (DE) .................... 10 2006 059 088

(51) Int. Cl.
*B60N 2/07* (2006.01)
*F16C 19/49* (2006.01)
*F16M 13/00* (2006.01)

(52) U.S. Cl. .................... 297/344.15; 248/421; 384/47; 384/58

(58) Field of Classification Search ............. 297/344.15; 248/421; 384/47, 58
See application file for complete search history.

(56) References Cited

U.S. PATENT DOCUMENTS

| | | | | |
|---|---|---|---|---|
| 3,265,450 | A | * | 8/1966 | Aho ............................. 384/58 X |
| 4,941,641 | A | * | 7/1990 | Granzow et al. .......... 248/421 X |
| 6,200,032 | B1 | | 3/2001 | Ropp |
| 7,775,718 | B2 | * | 8/2010 | Kohl et al. .................. 384/58 X |

FOREIGN PATENT DOCUMENTS

| | | |
|---|---|---|
| DE | 830 270 | 2/1952 |
| DE | 37 17 703 A1 | 12/1988 |
| DE | 102004038507 | 2/2006 |
| JP | 08 296639 | 11/1996 |

* cited by examiner

*Primary Examiner* — Rodney B White
(74) *Attorney, Agent, or Firm* — McGlew and Tuttle, P.C.

(57) ABSTRACT

A vehicle seat (1) is disclosed, particularly a commercial vehicle seat, with a seat base (3) which is designed as a scissors-type stand and is provided with intersecting rockers (15) and at least one frame (11, 13) that movably guides at least one of the rockers (15) in the longitudinal direction (x) of the vehicle seat (1) by a bearing mechanism (21). The bearing mechanism (21) features at least one compensating element that rests against a first guide (33), at least some sections of which are inclined at an angle (a) relative to the transversal direction (y) of the vehicle seat (1), and can be moved along the first guide (33) in the longitudinal direction (x). The bearing mechanism (21) further features at least one rotatably mounted wheel (23) which is supported on a second guide (35) and can be rolled along the second guide (35) in the longitudinal direction (x). A slider (31) which can be displaced along the first guide (33) is used as a compensating element.

19 Claims, 2 Drawing Sheets

VEHICLE SEAT, PARTICULARLY COMMERCIAL VEHICLE SEAT

CROSS REFERENCE TO RELATED APPLICATIONS

This application is a United States National Phase application of International Application PCT/EP2007/010496 and claims the benefit of priority under 35 U.S.C. §119 of German Patent Application DE 10 2006 059 088.0 filed, Dec. 13, 2006 the entire contents of which are incorporated herein by reference.

FIELD OF THE INVENTION

The invention relates to a vehicle seat, particularly a commercial vehicle seat, comprising a seat base configured as a scissors-type stand, which comprises intersecting rockers and at least one frame which movably guides at least one of the rockers by means of a bearing mechanism in a longitudinal direction of the vehicle seat, the bearing mechanism comprising at least one compensation element which bears against a first guide of the frame which is at least partially inclined at an angle relative to the transverse direction of the vehicle seat, and is movable along said first guide in the longitudinal direction and at least one rotatably mounted wheel which may roll along a second guide in the longitudinal direction.

BACKGROUND OF THE INVENTION

A vehicle seat of this type is known from DE 37 17 703 A1. The rockers are attached to cross bars which are movable by means of rollers in the frame used as rails. DE 10 2004 038 507 A1 discloses a bearing arrangement comprising a wheel which is supported on a lower limb of a frame, and a further wheel which bears against an upper limb of the frame, the limbs being located at different angles to the transverse direction of the vehicle seat.

SUMMARY OF THE INVENTION

The object of the invention is to provide an alternative vehicle seat of the aforementioned type.

This object is achieved according to the invention by a vehicle seat having a seat base configured as a scissors-type stand, which comprises intersecting rockers and at least one frame which movably guides at least one of the rockers by means of a bearing mechanism in a longitudinal direction (x) of the vehicle seat. The bearing mechanism comprises at least one compensation element which bears against a first guide of the frame which is at least partially inclined at an angle relative to the transverse direction (y) of the vehicle seat, and is movable along the first guide in the longitudinal direction (x) and at least one rotatably mounted wheel. The wheel is supported on a second guide of the frame and may roll along the second guide in the longitudinal direction (x). A slider is provided as the compensation element which is displaceable along the first guide.

The wheel supported on the second guide of the frame is in the power flux of the structure of the vehicle seat, whilst the slider bearing against the first guide of the frame is used for compensating play. To this end, the first guide is inclined—at least partially—relative to the transverse direction of the vehicle seat at an angle which is different by 0°, in order to be able to compensate for play both in the transverse direction and in the vertical direction. The backlash-free position may also be implemented by wheels instead of a slider (based on a slot nut, also denoted as a sliding block). The corresponding terms may therefore be widely interpreted.

The slider is preferably pretensioned, for example by means of pretensioning between different bearing elements, which is preferably applied by a spring. The pretensioning preferably exists between the first guide and a further component of the seat base, for example a cross bar which simultaneously may connect the scissor members and/or rotatably mount the wheel.

The wheel rolls along the preferably profiled second guide, which for example is provided on a lower limb of the frame, in order to travel along a defined path. Preferably on at least one vehicle seat side, the wheel is displaceable in the transverse direction in order to be able to cooperate with the second guide, irrespective of play. Preferably, the second guide in profile is inclined at least partially at the same angle as the upper limb relative to the transverse direction of the vehicle seat. Thus the wheel and the slider may be pretensioned relative to one another.

Preferably, the profile of the second guide is an isosceles triangle with the angle as a base angle, which centers the wheel, preferably rounded corners being provided for simplifying the manufacture by bending and for protecting from damage. The wheel is accordingly configured as a double cone wheel, depending on the orientation of the apex or imaginary apex of the isosceles triangle, said wheel comprising a central tapered portion or tapered portions relative to the front faces. The guides may—depending on the desired material pairings—be configured integrally with one another or respectively integrally with the frame or respectively as a separate component, any respective combinations being possible.

The bearing mechanism may be provided both on a lower frame of the scissors-type stand and on an upper frame, respectively alone or in combination. In the lower frame a direct power flux is preferably achieved in the direction of the vehicle chassis by the wheel bearing on the frame as accurately as possible above seat rails, which are attached to the lower frame for the longitudinal adjustment of the vehicle seat.

The invention is described in more detail hereinafter with reference to an embodiment shown in the drawings with a modification. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
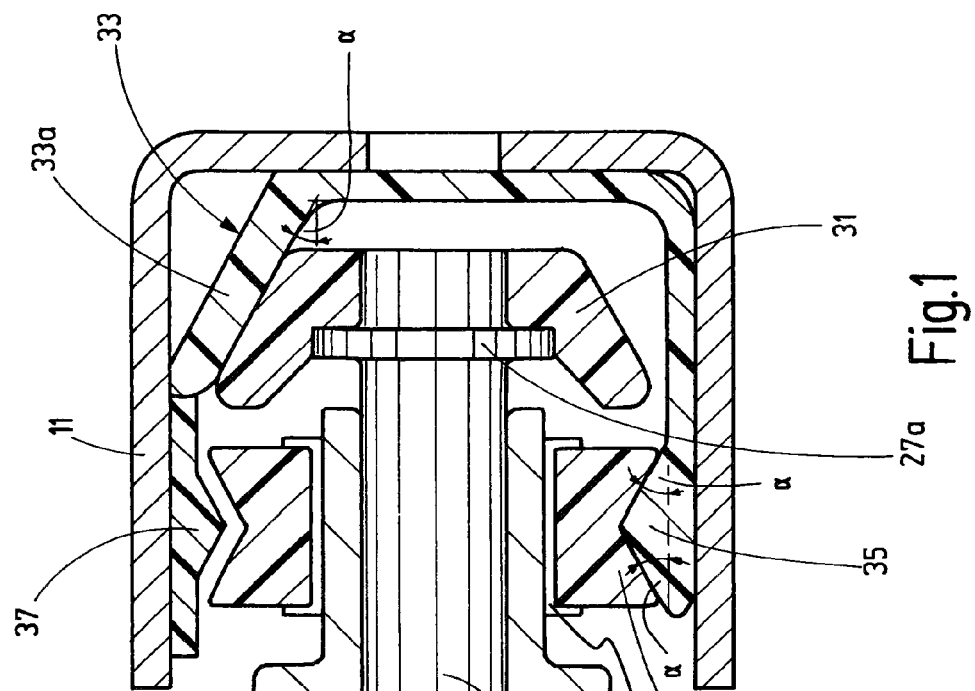
FIG. 1 is a section through a bearing mechanism according to the invention.
Figure 2:
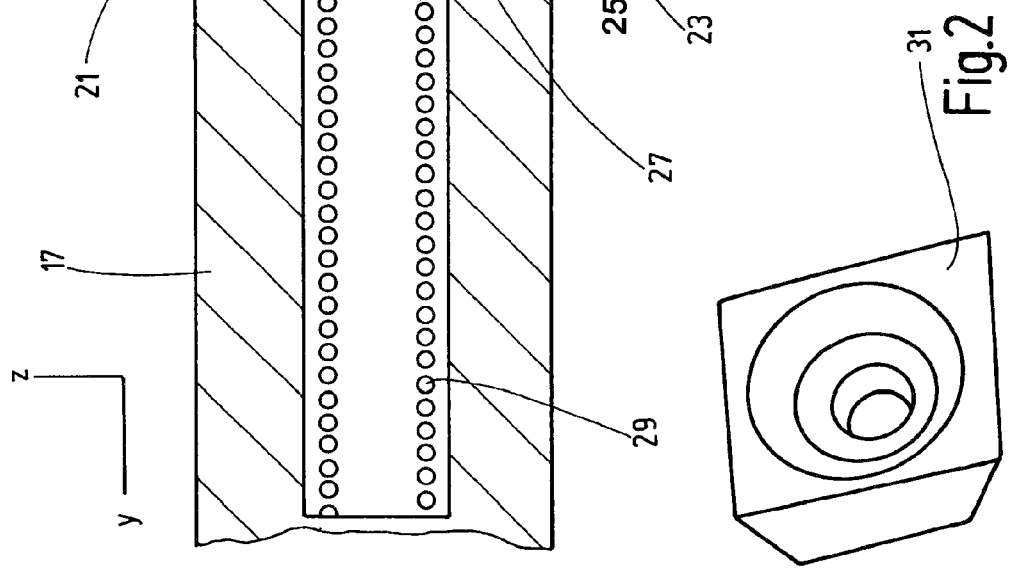
FIG. 2 is a perspective view of the slider.
Figure 3:
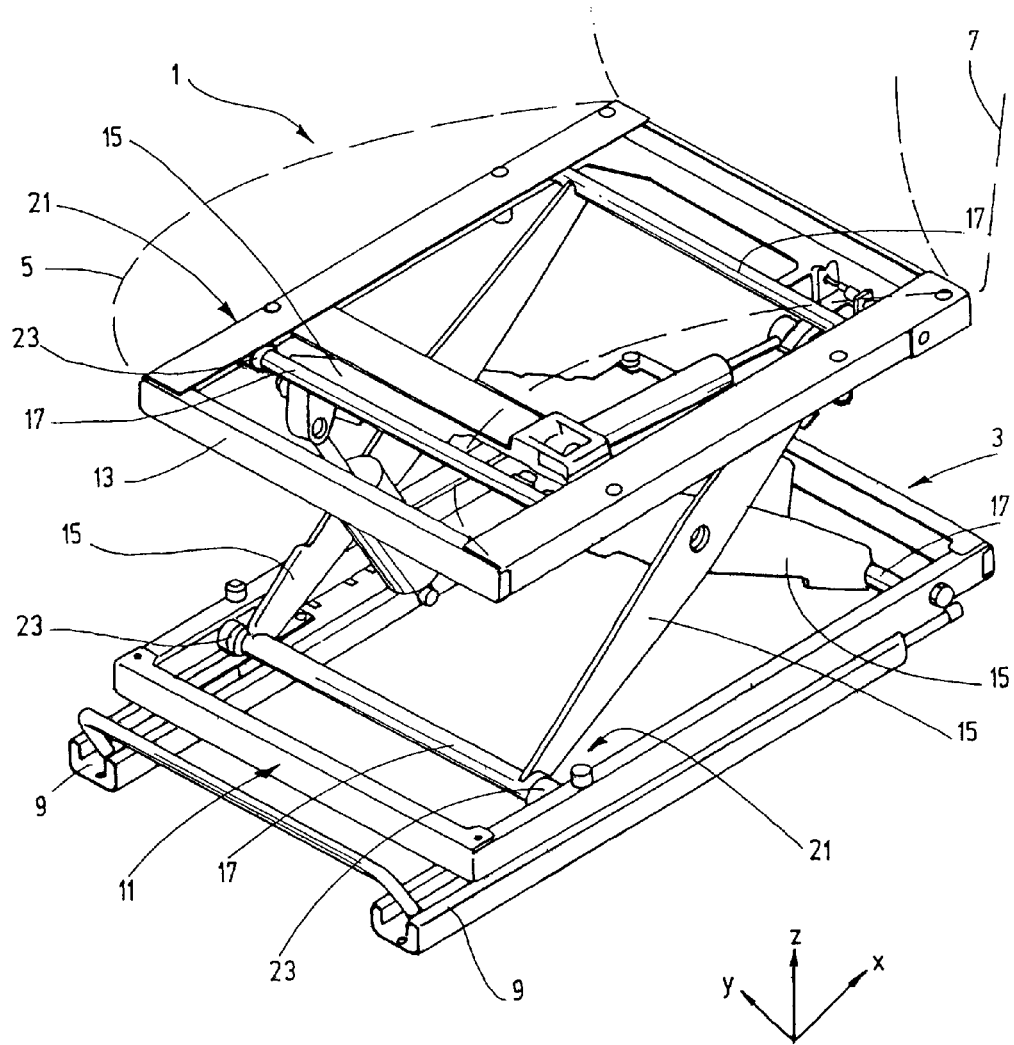
FIG. 3 is a perspective view of the embodiment, in which the seat cushion and backrest are only indicated.

Referring to the drawings in particular, a vehicle seat 1 of a commercial vehicle comprises a seat base 3, a seat cushion 5 mounted on the seat base 3, and a backrest 7 mounted on the seat base 3. The seat base 3 is preferably able to be longitudinally adjusted, by being attached to the vehicle chassis on both vehicle seat sides by means of one respective pair of seat rails 9. The seat base 3 is height-adjustable in a manner described hereinafter. The directions of movement of the parts of the vehicle seat 1 during height adjustment, the arrangement of the vehicle seat 1 in the commercial vehicle and the usual direction of travel thereof define the directional information used.

The seat base 3 is configured as a scissors-type stand—known in commercial vehicles. Between a lower frame 11 and an upper frame 13 one respective pair of intersecting rockers 15 is provided on both vehicle seat sides. The rockers 15 are at their ends respectively connected by horizontal cross bars 17 extending in the transverse direction of the vehicle seat 1 (y-direction, at the same time the horizontal direction), cross sections deviating from the circular shape and/or possibly solid cross sections also being intended to be understood thereby. The frames 11 and 13 respectively have a C-profile which is open toward the interior of the vehicle seat 1.

On the lower frame 11, the rockers 15 are articulated to the rear by means of the cross bar 17 at that point and movably mounted at the front by means of the cross bar 17 at that point and a bearing mechanism 21, described in more detail hereinafter, in the longitudinal direction of the vehicle seat 1. On the upper frame 13, the rockers 15 are releasably articulated at the rear by means of the cross bar 17 at that point and movably mounted at the front by means of the cross bar 17 at that point in the longitudinal direction of the vehicle seat 1 (x-direction), in the present case by means of a bearing mechanism 21 of the same construction. The seat rails 9 are attached to the lower frame 11, whilst the seat cushion 5 is mounted on the upper face of the upper frame 13. The seat rails 9 and the lower frame 11 may be arranged inclined relative to one another, so that the longitudinal adjustment of the vehicle seat 1 and the movement of the cross bar 17 do not have to take place parallel to one another in the longitudinal direction of the vehicle seat 1 (x-direction).

The bearing mechanism 21 comprises on each vehicle seat side a wheel 23 which in the present case comprises a separately configured hub 25, which however may also be an integrally configured component. By means of this hub 25, the wheel 23 is rotatably mounted on the associated cross bar 17, for which the cross bar 17 preferably has an end portion of smaller external diameter. Alternatively, a hollow bearing bush may also be attached to the cross bar 17, for example by a press fit. On at least one of the two vehicle seat sides, in the present case both sides, the wheel 23 is also displaceable in the y-direction. The wheel 23 preferably consists of a relatively hard plastics, for example POM or PA6.

In the cross bar 17 (or the bearing bush)—displaceable to a limited extent in the y-direction—a bearing pin 27 is mounted, the profile thereof not having to be circular, but also being able to be canted. The bearing pin 27 projects in the y-direction via the cross bar 17. The bearing pin 27 has a collar 27a here—offset to its outer front face—which forms the limit of the displacement of the bearing pin 27 toward the cross bar 17. On its inner front face, the bearing pin 27 is outwardly acted upon by a spring 29 in the y-direction. The spring 29 is entirely arranged inside the cross bar 17 and supported there, for example on a screw.

A slider 31 is located between the outer front face and the collar 27a on the bearing pin 27. The slider 31 may be mounted fixedly or—for tolerance compensation—rotatably on the bearing pin 27. The slider 31 is displaceable in the x-direction along a first guide 33, which is fastened to the lower frame 11 (and/or to the upper frame 13), for example inserted and screwed on, possibly also integrally configured therewith. The first guide 33 extends with a uniform profile in the x-direction, in the present case along the lower frame 11 against which it bears at the side. The material of the slider 31 and of the first guide 33 is selected so that a friction pair is produced with low friction. For example, the first guide 33 consists of POM, whilst the slider 31, for example, consists of PA or steel.

The wheel 23 is located in the vertical direction (z-direction) on a second guide 35, which is fastened to the lower frame 11 (and/or to the upper frame 13) and, for example in a similar manner to the first guide 33, is possibly also integrally configured with the frame 11 or 13, in the present case however integrally configured with the first guide 33. The second guide 35 in the present case bears against a lower limb of the frame 11 at the bottom, as accurately as possible above the seat rails 9, in order to direct the proportional seat weight as far as possible in the direct power flux toward the vehicle chassis. Different shapes of the second guide 35 are possible.

In the embodiment, the profile of the second guide 35 is an isosceles triangle with a base angle $\alpha$, the base extending in the y-direction, and with rounded corners, the imaginary apex facing toward the wheel 23, i.e. in the z-direction upwards. The second guide 35 is thus partially inclined with the base angle $\alpha$ relative to the y-direction. Accordingly, the wheel 23 is configured as a double cone wheel with a central tapered portion (in the manner of a "thread spool") and with—at least approximately—the base angle $\alpha$, the wheel 23 being able to be configured to bulge out slightly from this basic shape. In a modified embodiment, the profile of the second guide 35 faces away from the wheel 23, i.e. downward with a base angle $\alpha$ in the z-direction. Accordingly, the wheel 23 is configured as a double cone wheel with an outward tapered portion and with a base angle $\alpha$ or as a crowned wheel. Opposite the second guide 35 on the upper limb of the lower frame 11 a catch strip 37 is arranged, the profile thereof corresponding to that of the bearing 35 and which catches the wheel 23 if it were ever to leave the second guide 35 upwards in the z-direction. The catch strip 37 may be configured integrally with the first guide 33 or separately therefrom.

The region of the first guide 33, against which the slider 31 may bear, forms a bearing limb 33a of the first guide 33 which in profile, i.e. in the plane spanned by the y-direction and the z-direction, extends obliquely to the y-direction and namely in the present case with the base angle $\alpha$ of the second guide 35, a different angle also being possible. The slider 31 bears in this case at the top (+z-direction) against this bearing limb 33a of the first guide 33, whilst at the bottom (−z-direction) it is spaced apart from the first guide 33. The pretensioning of the bearing pin 27 which presses the slider 31 in the y-direction outwardly with its collar 27a, firstly ensures that play is compensated in the y-direction which, for example, is provided with regard to the oversize or undersize of components subjected to tolerances. By the oblique orientation of the bearing limb 33a, a portion of the pretensioning is also diverted in the z-direction in order to pretension the wheel 23 and the slider 31 relative to one another. This compensates play in the z-direction. The slider 31 thus acts as a compensation element for play in the y-direction and in the z-direction.

In the present case, the same bearing mechanism 21 is present on the upper frame 13, apart from the direct effect on the seat rails 9—which is only present at the bottom—in the present description the upper frame 13 being accordingly understood instead of the lower frame 11. A movement of the front cross bar 17 in the x-direction which is preferably defined by stops and during which the slider 31 slides along the first guide 33, and the wheel 23 rolls along the second guide 35, causes a pivoting movement of the rockers 15, which leads to a height adjustment of the upper frame 13 and thus of the seat cushion 5.

While specific embodiments of the invention have been described in detail to illustrate the application of the principles of the invention, it will be understood that the invention may be embodied otherwise without departing from such principles.

The invention claimed is:

1. A vehicle seat, comprising:
a seat base with a scissors-stand comprising intersecting rockers and a frame with a first guide and a second guide; and
a bearing mechanism, said frame for movably guiding at least one of said rockers by means of said bearing mechanism in a longitudinal direction of the vehicle seat, the bearing mechanism comprising at least one compensation element comprising a slider which is displaceable along the first guide bearing against said first guide, wherein at least one portion of said first guide is at least partially inclined at an angle relative to a transverse direction of the vehicle seat, said slider comprising a first planar outer surface at least partially inclined at an angle relative to the transverse direction of the vehicle seat for engaging said at least partially inclined portion of said first guide, said slider comprising a second planar outer surface, said first planar outer surface and said second planar outer defining an edge extending in a direction parallel to said at least one portion of said first guide, said compensation element being movable along said first guide in the longitudinal direction and at least one rotatably mounted wheel supported on said second guide for rolling along said second guide in the longitudinal direction, said at least one rotatably mounted wheel comprising a double cone wheel.

2. The vehicle seat as claimed in claim 1, wherein the second guide in profile is inclined at least partially at said angle relative to the transverse direction of the vehicle seat.

3. The vehicle seat as claimed in claim 2, wherein the profile of said second guide is an isosceles triangle with said angle as a base angle and with rounded corners.

4. The vehicle seat as claimed in claim 3, wherein the apex or imaginary apex of the isosceles triangle faces toward the wheel or away therefrom.

5. The vehicle seat as claimed in claim 1, wherein said guides are configured at least one of integrally with one another, integrally with the frame and as separate components.

6. The vehicle seat as claimed in claim 1, wherein said at least one rotatably mounted wheel is displaceable in the transverse direction of the vehicle seat on a cross bar of said seat base, said at least one rotatably mounted wheel being rotatably mounted on said cross bar.

7. The vehicle seat as claimed in claim 1, wherein said slider is mounted on a bearing pin, said bearing pin and/or said slider being displaceable in the transverse direction of the vehicle seat.

8. The vehicle seat as claimed in claim 1, wherein the slider is pretensioned in the transverse direction of the vehicle seat relative to the first guide.

9. The vehicle seat as claimed in claim 8, wherein said slider is pretensioned by a bearing pin biased by a spring supported on a cross bar of said seat base.

10. A vehicle seat, comprising:
a seat base with a lower frame with a lower first guide and a lower second guide, an upper frame with an upper first guide and an upper second guide, first side rockers with a pivot intersection and second side rockers with a pivot intersection; and
a bearing mechanism providing a bearing connection between an upper end of said first side rockers and an upper end of said second side rockers with said upper frame and providing a bearing connection between a lower end of said first side rockers and a lower end of said second side rockers with said lower frame, for movably guiding said upper and lower rocker ends by means of said bearing mechanism in a longitudinal direction of the vehicle seat, the bearing mechanism comprising, at each of said upper and lower rocker ends, at least one compensation element comprising a slider which is displaceable along the first guide bearing against said first guide, said first guide being at least partially inclined at an angle relative to a transverse direction of the vehicle seat, said slider comprising at least one planar outer surface located on a first side thereof, said at least one planar outer surface being in sliding contact with said at least partially inclined portion of said first guide without said slider rotating relative to said first guide, said at least one planar outer surface being at least partially inclined at an angle relative to said transverse direction of the vehicle seat, said slider comprising at least another planar outer surface on a second side thereof, said at least one planar outer surface and said at another planar outer surface defining an edge extending parallel to said first guide, said compensation element being movable along said first guide in the longitudinal direction and at least one rotatably mounted wheel supported on said second guide for rolling along said second guide in the longitudinal direction, said at least one rotatably mounted wheel comprising a double cone wheel.

11. The vehicle seat as claimed in claim 10, wherein the second guide in profile is inclined at least partially at said angle relative to the transverse direction of the vehicle seat.

12. The vehicle seat as claimed in claim 11, wherein the profile of said second guide is an isosceles triangle with said angle as a base angle and with rounded corners.

13. The vehicle seat as claimed in claim 12, wherein the apex or imaginary apex of the isosceles triangle faces toward the wheel or away therefrom.

14. The vehicle seat as claimed in claim 10, wherein said guides are configured at least one of integrally with one another, integrally with the frame and as separate components.

15. The vehicle seat as claimed in claim 10, wherein said at least one rotatably mounted wheel is displaceable in the transverse direction of the vehicle seat on a cross bar of said seat base, said at least one rotatably mounted wheel being rotatably mounted on said cross bar.

16. The vehicle seat as claimed in claim 10, wherein said slider is mounted on a bearing pin, said bearing pin and/or said slider being displaceable in the transverse direction of the vehicle seat.

17. The vehicle seat as claimed in claim 10, wherein the slider is pretensioned in the transverse direction of the vehicle seat relative to the first guide.

18. The vehicle seat as claimed in claim 17, wherein said slider is pretensioned by a bearing pin biased by a spring supported on a cross bar of said seat base.

19. A vehicle seat, comprising:
a seat base with a scissors-stand comprising intersecting rockers and a frame with a first guide and a second guide; and a bearing mechanism, said frame for movably guiding at least one of said rockers by means of said bearing mechanism in a longitudinal direction of the vehicle seat, the bearing mechanism comprising at least one compensation element comprising a slider which is displaceable along the first guide bearing against said first guide, wherein at least one portion of said first guide is at least partially inclined at an angle relative to a transverse direction of the vehicle seat, said slider comprising a first planar outer surface at least partially inclined at an angle relative to the transverse direction of the vehicle seat for engaging said at least partially inclined portion of said first guide, said slider comprising a second planar outer surface, said first planar outer surface and said second planar outer defining an edge extending in a direction parallel to said at least one portion of said first guide, said compensation element being movable along said first guide in the longitudinal direction and at least one rotatably mounted wheel supported on said second guide for rolling along said second guide in the longitudinal direction, said second guide in profile being inclined at least partially at said angle relative to the transverse direction of the vehicle seat, said profile of said second guide being an isosceles triangle with said angle as a base angle and with rounded corners.

* * * * *